US011619252B2

(12) United States Patent
Faghidi et al.

(10) Patent No.: US 11,619,252 B2
(45) Date of Patent: Apr. 4, 2023

(54) WALLBOARD ANCHOR

(71) Applicant: THE HILLMAN GROUP, INC., Cincinnati, OH (US)

(72) Inventors: Hamid Faghidi, Ontario (CA); Nalinikanth Garikapati, Phoenix, AZ (US); Michael Martin Hicks, Gilbert, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 147 days.

(21) Appl. No.: 16/694,221

(22) Filed: Nov. 25, 2019

(65) Prior Publication Data

US 2020/0173477 A1 Jun. 4, 2020

Related U.S. Application Data

(60) Provisional application No. 62/774,187, filed on Dec. 1, 2018.

(51) Int. Cl.
| | | |
|---|---|---|
| *F16B 13/04* | (2006.01) | |
| *F16B 13/00* | (2006.01) | |
| *F16B 13/08* | (2006.01) | |
| *F16B 13/12* | (2006.01) | |
| *A47G 1/20* | (2006.01) | |

(52) U.S. Cl.
CPC ........ *F16B 13/002* (2013.01); *F16B 13/0891* (2013.01); *A47G 1/20* (2013.01); *F16B 13/124* (2013.01)

(58) Field of Classification Search
CPC ... F16B 13/002; F16B 13/0891; F16B 13/124
USPC .......... 411/29, 30, 387.1, 387.2, 387.3, 412, 411/413, 426
See application file for complete search history.

(56) References Cited

U.S. PATENT DOCUMENTS

| | | | | |
|---|---|---|---|---|
| 120,577 | A | * | 11/1871 | Farrel |
| 438,754 | A | * | 10/1890 | Rogers ................ H04J 14/0212 |
| 1,084,643 | A | * | 1/1914 | Lasater ................. F16B 25/103 |
| | | | | 411/399 |
| 2,169,408 | A | * | 8/1939 | De Vellier ................ E01B 9/06 |
| | | | | 411/412 |
| 3,045,523 | A | * | 7/1962 | Reed, II ............. F16B 25/0015 |
| | | | | 411/387.1 |
| 3,703,843 | A | * | 11/1972 | Laverty ............... F16B 25/0068 |
| | | | | 411/413 |
| RE28,111 | E | * | 8/1974 | Laverty ............... F16B 25/0057 |
| | | | | 411/412 |
| 4,601,625 | A | | 7/1986 | Ernst |
| 4,763,456 | A | | 8/1988 | Giannuzzi |
| 4,892,429 | A | | 1/1990 | Giannuzzi |

(Continued)

FOREIGN PATENT DOCUMENTS

CA 2205901 5/1996

*Primary Examiner* — Gary W Estremsky
(74) *Attorney, Agent, or Firm* — Thompson Hine LLP

(57) ABSTRACT

An anchor for wallboard installation includes an anchor body elongated along an axis, the anchor body including a driving end, a wall boring end and an internal bore running from the driving end to an internal end short of a distal tip of the wall boring end. The anchor body includes a first frusto-conical body portion, a second frusto-conical body portion running from the first frusto-conical body portion to an annular groove and an end body portion running from the annular groove toward the distal tip.

17 Claims, 16 Drawing Sheets

(56) References Cited

U.S. PATENT DOCUMENTS

| | | |
|---|---|---|
| 5,039,262 A | 8/1991 | Giannuzzi |
| 5,160,225 A | 11/1992 | Chern |
| 5,190,425 A | 3/1993 | Wieder |
| 5,234,299 A | 8/1993 | Giannuzzi |
| 5,259,398 A * | 11/1993 | Vrespa ............... A61B 17/863 |
| | | 128/898 |
| 5,267,423 A | 12/1993 | Giannuzzi |
| 5,308,203 A | 5/1994 | McSherry |
| 5,413,444 A | 5/1995 | Thomas |
| 5,449,257 A | 9/1995 | Giannuzzi |
| 5,482,418 A | 1/1996 | Giannuzzi |
| 5,529,449 A | 6/1996 | McSherry |
| 5,536,121 A | 7/1996 | McSherry |
| 5,558,479 A | 9/1996 | McElderry |
| 5,625,994 A | 5/1997 | Giannuzzi |
| 5,630,688 A | 5/1997 | Tran |
| 5,692,864 A | 12/1997 | Powell |
| 5,752,792 A | 5/1998 | McSherry |
| 5,833,415 A | 11/1998 | McSherry |
| 5,944,295 A | 8/1999 | McSheny |
| 6,042,314 A * | 3/2000 | Guelck ............... F16B 25/0031 |
| | | 29/525.11 |
| 6,079,921 A | 6/2000 | Gauthier |
| 6,139,236 A | 10/2000 | Ito |
| 6,186,716 B1 | 2/2001 | West |
| 6,196,780 B1 | 3/2001 | Wakai |
| 6,306,140 B1 * | 10/2001 | Siddiqui ............... A61B 17/863 |
| | | 606/315 |
| 6,354,779 B1 | 3/2002 | West |
| 6,382,892 B1 | 5/2002 | Hempfling |
| D462,895 S | 9/2002 | Gaudron |
| 6,679,661 B2 | 1/2004 | Huang |
| 6,882,892 B2 | 4/2005 | Farrah |
| 6,896,460 B2 * | 5/2005 | Enomoto ............ F16B 19/1081 |
| | | 411/41 |
| 6,896,462 B2 | 5/2005 | Stevenson |
| 7,001,124 B2 | 2/2006 | Panasik |
| 7,143,497 B2 | 12/2006 | Panasik |
| 7,144,212 B2 | 12/2006 | Kaye |
| 7,261,505 B2 | 8/2007 | Ernst |
| 7,266,874 B2 | 9/2007 | Ernst |
| 7,290,972 B2 | 11/2007 | Gauthier |
| 7,320,569 B2 | 1/2008 | Kaye |
| 7,517,182 B2 | 4/2009 | Cabrele |
| D593,141 S | 5/2009 | Gaudron |
| D605,933 S | 12/2009 | Gaudron |
| 7,654,781 B2 | 2/2010 | McDuff |
| 7,686,556 B2 * | 3/2010 | Belinda ............... E04C 3/12 |
| | | 411/387.2 |
| 7,762,751 B2 | 7/2010 | Panasik |
| 7,815,407 B2 | 10/2010 | Kucharyson |
| 7,883,307 B2 | 2/2011 | Pippard |
| 7,934,895 B2 | 5/2011 | Ernst |
| D642,900 S | 8/2011 | McDuff |
| 8,057,147 B2 | 11/2011 | Ernst |
| 8,066,461 B2 * | 11/2011 | Travers ............... F16B 5/0208 |
| | | 411/352 |
| 8,192,123 B2 * | 6/2012 | Ernst ............... F16B 25/106 |
| | | 411/387.1 |
| 8,303,224 B2 | 11/2012 | McDuff |
| RE44,016 E | 2/2013 | Remmer |
| 8,376,679 B2 | 2/2013 | Gaudron |
| 8,449,236 B2 | 5/2013 | McDuff |
| 8,764,364 B2 | 1/2014 | Brown |
| 8,740,527 B2 | 6/2014 | Cheng |
| 9,133,630 B2 | 9/2015 | Dougherty |
| 9,353,782 B2 | 5/2016 | McDuff |
| 9,482,258 B2 * | 11/2016 | Park ............... F16B 25/0063 |
| 9,857,662 B2 * | 1/2018 | Kato ............... H04J 14/0212 |
| 9,885,378 B2 | 2/2018 | DeClark |
| 2004/0052606 A1 | 3/2004 | Kerl |
| 2004/0141827 A1 * | 7/2004 | Dicke ............... F16B 25/0073 |
| | | 411/413 |
| 2005/0084360 A1 * | 4/2005 | Panasik ............... F16B 13/002 |
| | | 411/44 |
| 2005/0214095 A1 | 9/2005 | Brown |
| 2006/0018730 A1 | 1/2006 | Ernst |
| 2006/0127199 A1 | 6/2006 | Bappert |
| 2006/0165506 A1 | 7/2006 | Panasik |
| 2007/0217887 A1 * | 9/2007 | Lin ............... F16B 25/0068 |
| | | 411/413 |
| 2016/0102696 A1 | 4/2016 | DeClark |
| 2017/0051772 A1 | 2/2017 | McDuff |
| 2017/0089380 A1 | 3/2017 | McDuff |

\* cited by examiner

WALLBOARD ANCHOR

TECHNICAL FIELD

This application relates generally to wall anchors for drywall and other types of wallboard, and more particularly, to a wallboard penetrating anchor.

BACKGROUND

A variety of types of wall anchors are known, including anchors that can be rotated into wallboard without pre-drilling a hole in the wallboard. Improvements in both the manufacturability and performance of such anchors is continually sought.

SUMMARY

In one aspect, an anchor for wallboard installation includes an anchor body elongated along an axis, the anchor body including a driving end, a wall boring end and an internal bore running from the driving end to an internal end short of a distal tip of the wall boring end. The anchor body includes a first frusto-conical body portion, a second frusto-conical body portion running from the first frusto-conical body portion to an annular groove and an end body portion running from the annular groove toward the distal tip.

In another aspect, an anchor for wallboard installation includes an anchor body elongated along an axis, the anchor body including a driving end, a wall boring end and an internal bore running from the driving end to an internal end short of a distal tip of the wall boring end. The anchor body includes a first frusto-conical body portion, a second frusto-conical body portion and an end body portion, wherein the second frusto-conical body portion is between the first frusto-conical body portion and the end body portion. A taper angle of the second frusto-conical body portion is greater than a taper angle of the first frusto-conical body portion. A taper angle of the end body portion is equal to or less than the taper angle of the second frusto-conical body portion. The first frusto-conical body portion includes a thread, the end body portion includes a double start thread, and the second frusto-conical body portion lacks any thread.

In another aspect, an anchor for wallboard installation includes an anchor body elongated along an axis, the anchor body including a driving end, a wall boring end and an internal bore running from the driving end to an internal end short of a distal tip of the wall boring end. The anchor body includes a first frusto-conical body portion, a second frusto-conical body portion and an end body portion, wherein the second frusto-conical body portion is between the first frusto-conical body portion and the end body portion. The first frusto-conical body portion includes a thread, the end body portion includes a thread, and the second frusto-conical portion lacks any thread.

In another aspect, an anchor for wallboard installation, includes an elongated anchor body including a driving end, a wall boring end and an internal bore running from the driving end to an internal end that short of a distal tip of the anchor body, wherein the anchor further comprises one or more features selected from the following:
(i) the anchor body having a first frusto-conical body portion, a second frusto-conical body portion running from the first frusto-conical body portion to an annular groove and an end body portion running from the annular groove toward the distal tip, wherein a taper angle of the second frusto-conical body portion is greater than a taper angle of the first frusto-conical body portion, and wherein a taper angle of the end body portion is equal to or less than the taper angle of the second frusto-conical body portion; or
(ii) the anchor body having a first frusto-conical body portion, a second frusto-conical body portion running from the first frusto-conical body portion to an annular groove and an end body portion running from the annular groove toward the distal tip, wherein the first frusto-conical body portion includes a thread, the end body portion includes a double start thread, and the second frusto-conical body portion lacks any thread; or
(iii) the anchor body having a first frusto-conical body portion, a second frusto-conical body portion running from the first frusto-conical body portion to an annular groove and an end body portion running from the annular groove toward the distal tip, wherein the first frusto-conical body portion includes a thread, the end body portion includes a double start thread, and the second frusto-conical body portion lacks any thread but includes a set of diametrically opposed lug projections that have a common axial location along a length of the anchor body; or
(iv) the anchor body having a first frusto-conical body portion, a second frusto-conical body portion running from the first frusto-conical body portion to an annular groove and an end body portion running from the annular groove toward the distal tip, wherein the first frusto-conical body portion includes a thread, the end body portion includes a thread, and the anchor body includes a pair of diametrically opposed key-shaped through openings to the internal bore; or
(v) the anchor body having a first frusto-conical body portion, a second frusto-conical body portion running from the first frusto-conical body portion to an annular groove and an end body portion running from the annular groove toward the distal tip, wherein the first frusto-conical body portion includes a thread, the end body portion includes a thread, and the anchor body includes a pair of diametrically opposed key-shaped through openings to the internal bore, wherein the key-shaped through openings intersect the annular groove; or
(vi) the anchor body having a first frusto-conical body portion, a second frusto-conical body portion running from the first frusto-conical body portion to an annular groove and an end body portion running from the annular groove toward the distal tip, wherein the first frusto-conical body portion includes a thread, the end body portion includes a thread, and the anchor body includes a pair of diametrically opposed key-shaped through openings to the internal bore, wherein the key-shaped through openings include a blade section that is located entirely on the second frusto-conical body portion and a bow section that begins on the second frusto-conical body portion and extends onto the end body portion; or
(vii) the anchor body having a first frusto-conical body portion, a second frusto-conical body portion running from the first frusto-conical body portion to an annular groove and an end body portion running from the annular groove toward the distal tip, wherein the first frusto-conical body portion includes a thread, the end body portion includes a thread, the thread of the end body portion starts at an axial location spaced from the distal tip, and a set of diametrically opposed flats are formed on the end body portion and run from the axial location toward the distal tip.

The details of one or more embodiments are set forth in the accompanying drawings and the description below. Other features, objects, and advantages will be apparent from the description and drawings, and from the claims.

DETAILED DESCRIPTION

Figure 1:
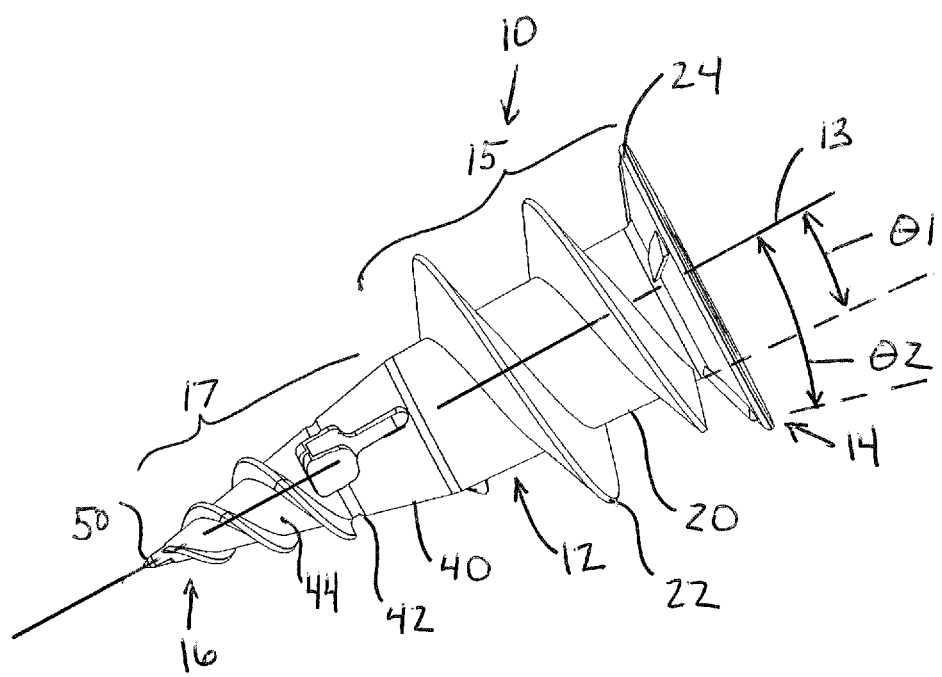
FIGS. 1 and 2 show perspective views of one embodiment of an anchor.
Figure 2:
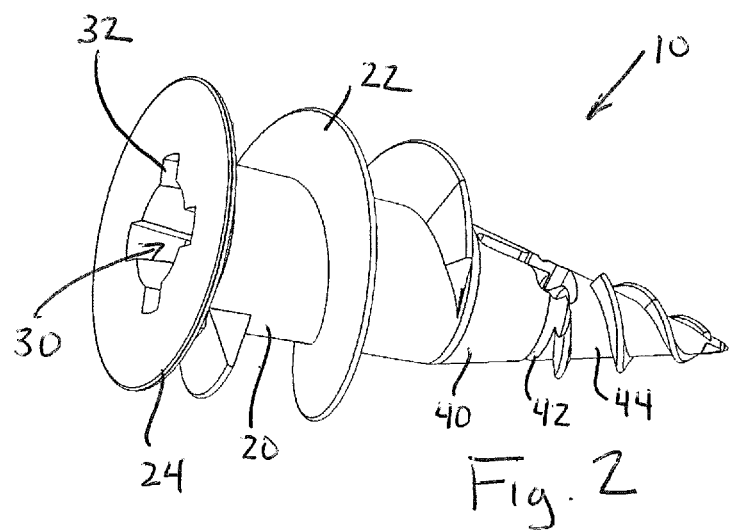
Figure 3:
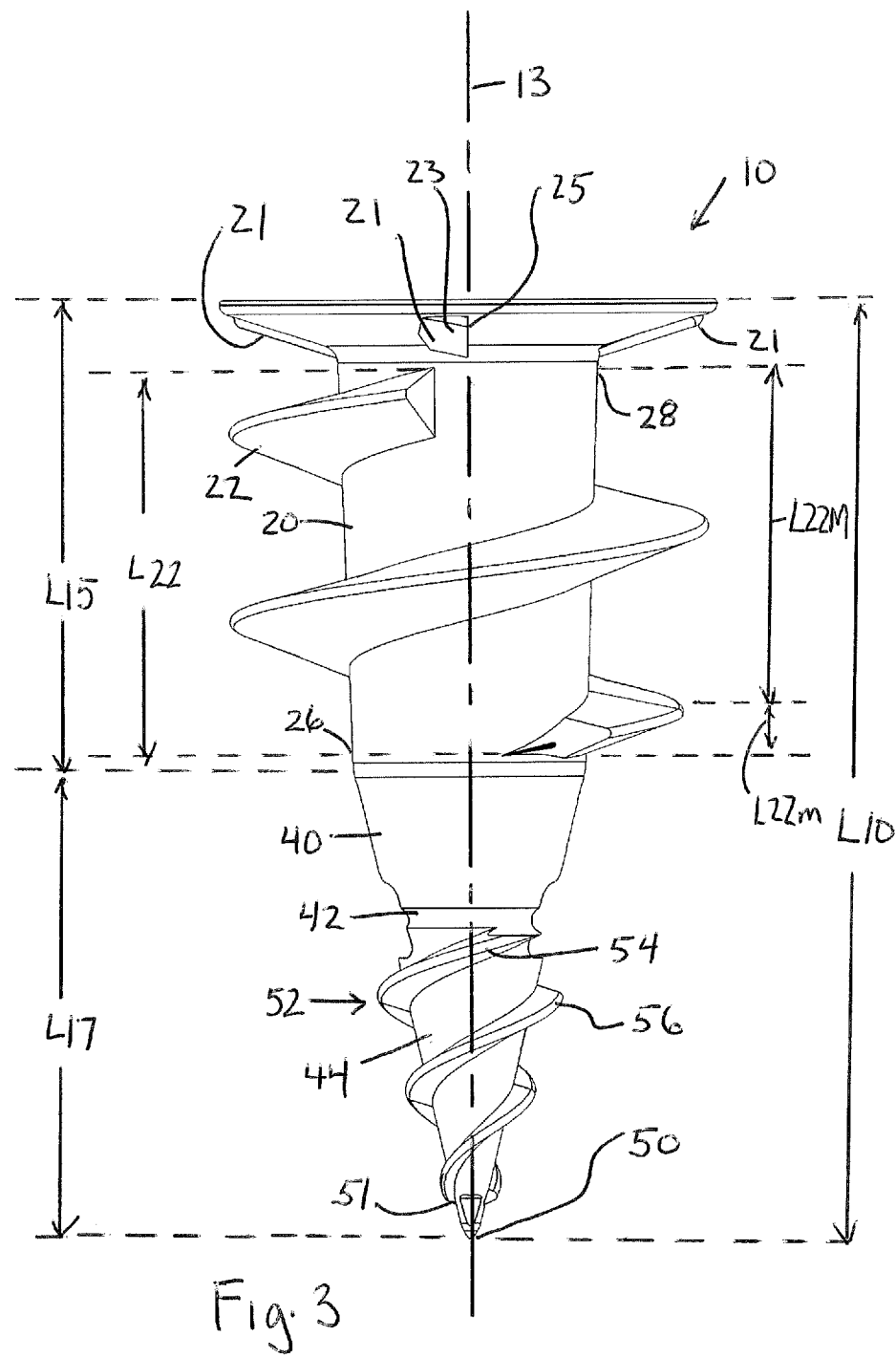
FIGS. 3-5 show side elevations of the anchor.
Figure 4:
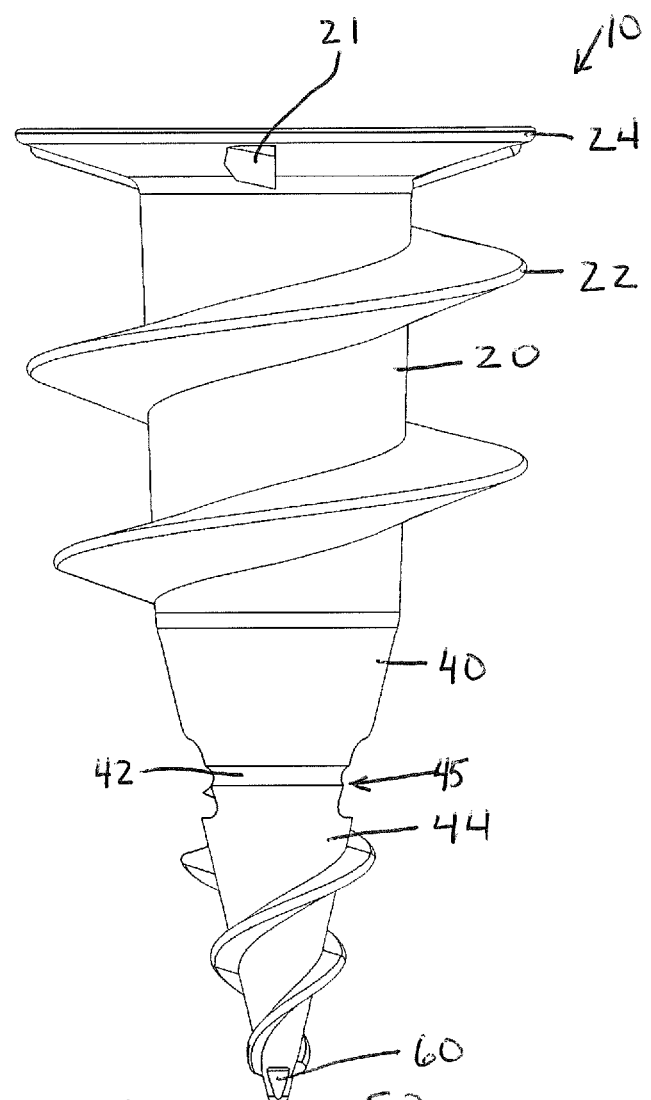
Figure 5:
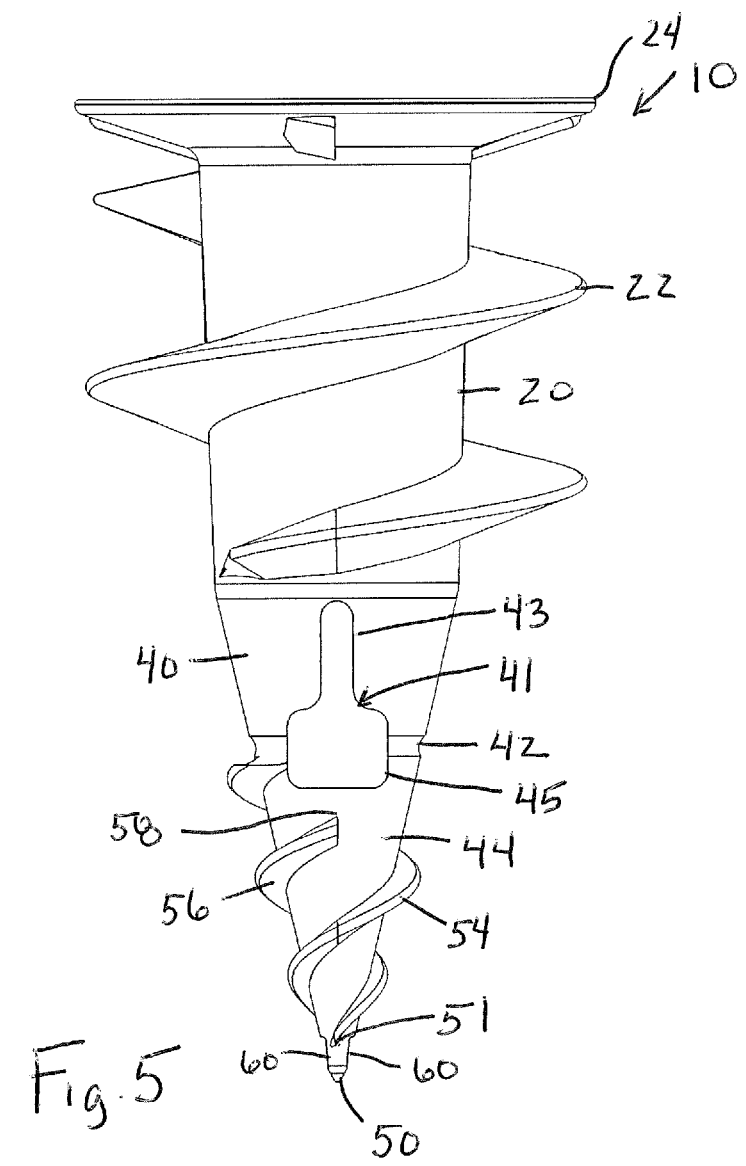
Figure 6:
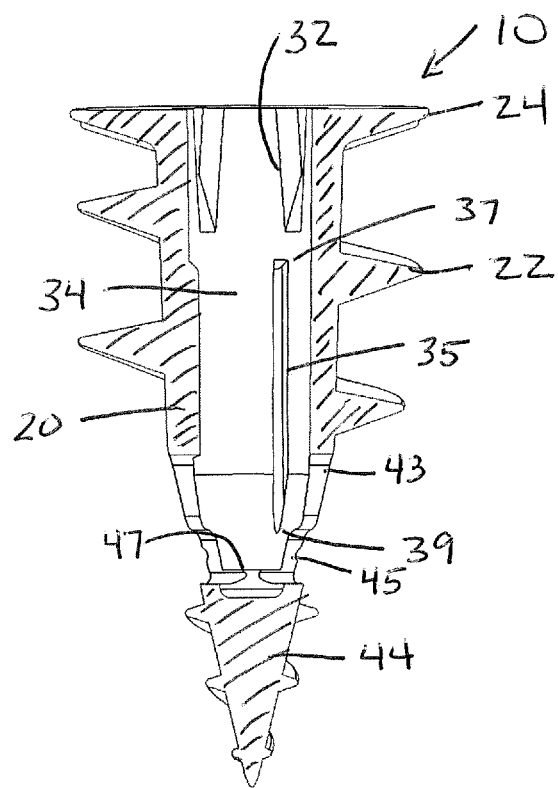
FIGS. 6-8 show cross-sections of the anchor.
Figure 7:
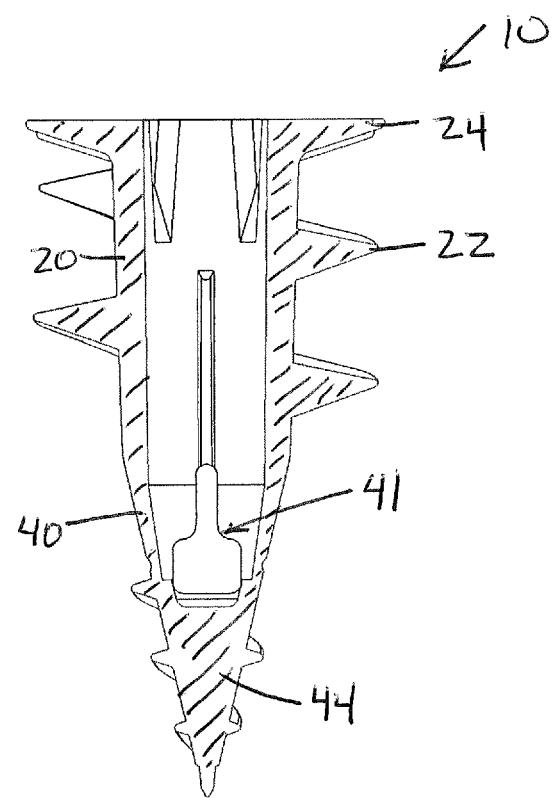
Figure 8:
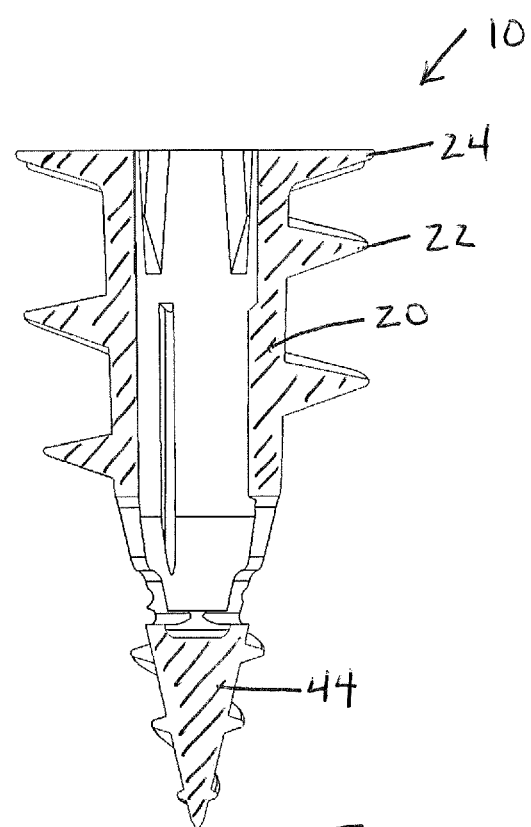
Figure 9:
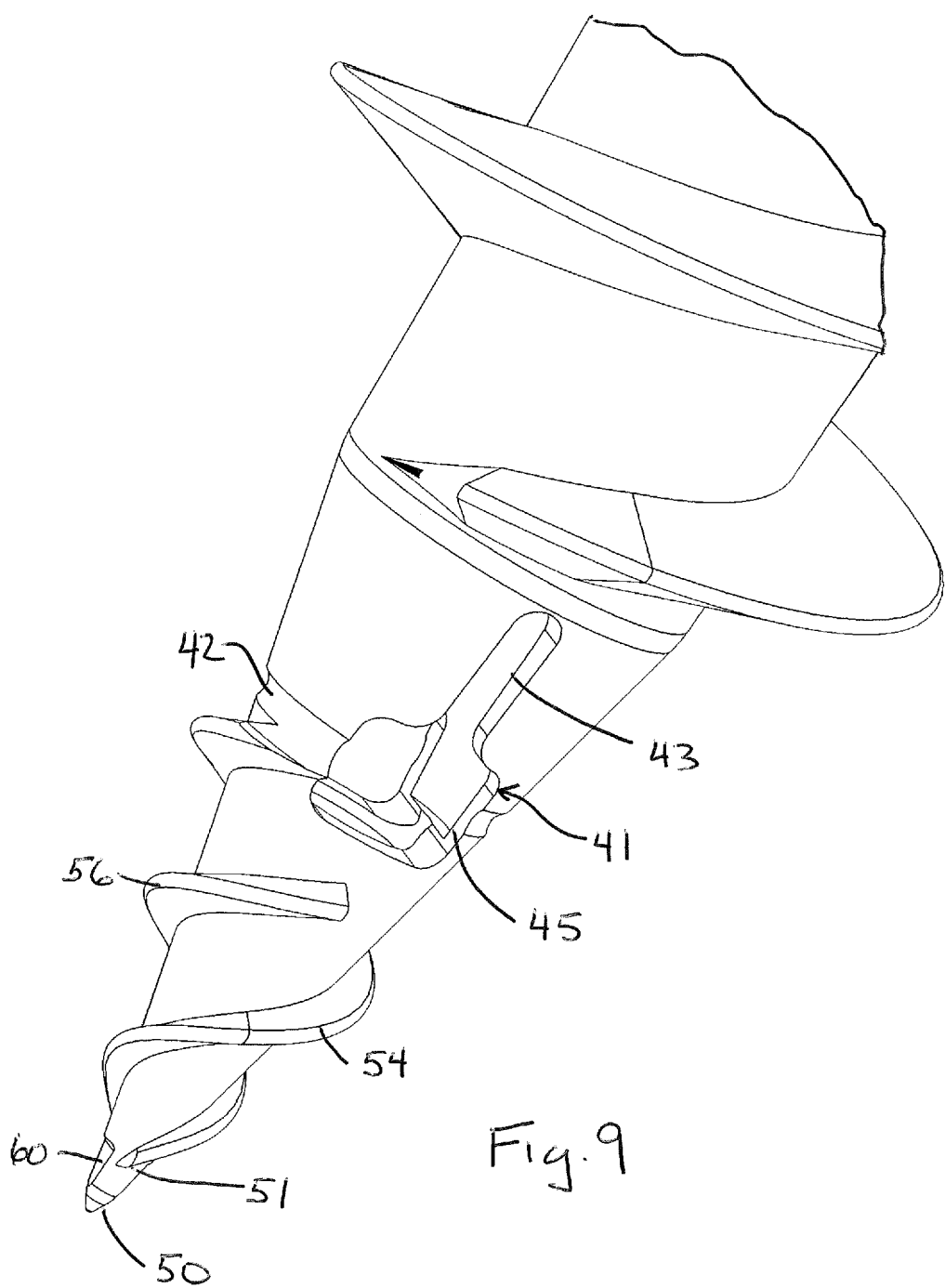
FIG. 9 shows a perspective partial view of the anchor.
Figure 10:
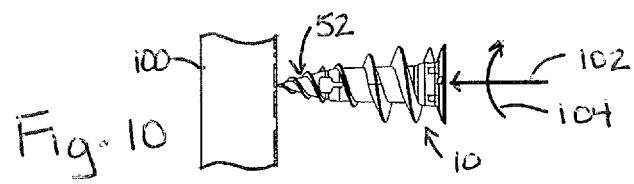
FIGS. 10-14 show an anchor install sequence.
Figure 11:
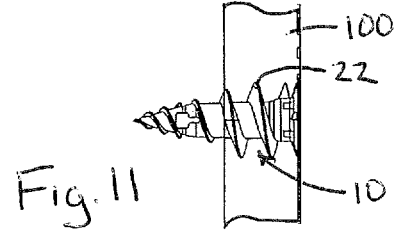

In the drawings and description of various anchor embodiments below, the term wallboard is generally used to refer to the most common wallboard such as drywall, but it is recognized that the anchor components may be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-9, in one embodiment, an anchor 10 includes an elongated anchor body 12 with a lengthwise central axis 13, and has a driving end 14 and a wall boring end 16. The anchor body may, for example, be formed of a die cast metal material, such as zinc. The anchor body includes a major segment 15 extending from the driving end toward the wall boring end, and a minor segment 17 extending from the major portion 15 to the distal point of the anchor. The major segment 15 may have an axial length L15 that is between about 40% to 60% of the full axial length L10 of the anchor, and preferably length L15 is at least 50% of length L10. The major segment 15 includes a frusto-conical body portion 20 with a thread 22 formed thereon. The thread 22 will operate to engage with wallboard material to help retain the anchor body to a wall when installed. The thread 22 runs helically with a constant pitch and may have an axial length L22 that is between about 30% and about 50% of the full anchor length L10 (e.g., length L22 is between about 37% and 43% of length L10). The frusto-conical body portion 20 may, for example, be offset from parallel to axis 13 by an angle θ1 of between about one degree to about five degrees. A major portion of the thread along an axial length L22M includes a substantially constant thread height and a minor portion of the thread along an axial length L22m has a thread height that rapidly reduces. The length L22M may be between about 75% and 95% of length L22, such as at least 80%.

A flange 24 extends outward from the front end of portion 20 and will engage with the front surface of a wall to define the limit of penetration of the anchor. The forward side or wall facing side of the flange 24 may be slightly tapered (e.g., slight frusto-conical shape) to push the outer surface of the wall inward slightly so that the face of the flange sits more flush with the wall surface. The forward side of the flange includes a set of nibs 21 (here four nibs spaced circumferentially at 90 degrees). The nibs 21 include a ramped leading face 23 that runs to a stepped trailing face 25, such that the nibs will easily engage with the wall surface during anchor installation, and the stepped trailing faces 25 will provide some bite into the wall surface that will enhance resistance to rotation out of the wall.

The thread 22 begins at an axial location 26 along the body portion 20 and ends at a location 28 short of the flange 24. The rear face of the flange 24 defines an opening 30 into the body 20 and includes an end portion defining a fastener driving recess 32 (e.g., a Phillips recess or some other configuration). Inward of the recess 32 (toward the distal tip of the anchor body), an internal bore 34 of the body 20 is provided for receiving a threaded fastener (e.g., a screw or bolt). The internal bore 34 may include a set of projecting ribs 35 that extend axially. The ribs 35 begin at a location 37 spaced from the drive recess 32 and terminate at locations (e.g., 39) short of the interior end 47 of the bore 34.

The minor segment 17 includes a frusto-conical body portion 40 that runs from the major segment toward an annular groove 42. The angle of taper in body portion 40 is more aggressive than the angle of taper in body portion 20. In this regard, the frusto-conical body portion 40 may, for example, be offset from parallel to axis 13 by an angle θ2 of between about two to ten degrees. The outer surface of body portion 40 is smooth and unthreaded to provide a clean transition through the wall immediately in front of the thread 22. The groove 42 separates body portion 40 from an end body portion 44. Here, the taper of end body portion 44 matches the taper of body portion 40, but the two tapers could be different.

Diametrically opposed key-shaped through openings 41 to the bore 34 begin on the body portion 40 and transition onto the end body portion 44. The key-shape includes an elongated blade section 43 and an enlarged bow section 45. The blade section 43 runs axially in side view and the bow section 45 is generally rectangular in side view. Curved perimeter transitions are provided at the free end of the blade section, from the blade section to the bow section and in the corner regions on the bow section. The bow section 45 intersects the annular groove 42 to create discontinuities in the annular groove. Each bow section 45 may extend circumferentially by at least sixty degrees (e.g., at least seventy degrees) at the portion of the bow section that is axially aligned with the groove 42. The combination of the thinner wall material along the discontinuous annular groove 42 and the wall gaps provided by the bow sections 45 create an axial location of weakening in the anchor body that will allow the end body portion 44 to separate from the rest of the anchor when a fastener is inserted, as will be shown in more detail below.

The end body portion 44 tapers toward a distal tip 50 of the anchor. The end body portion 44 includes a double start thread 52 the begins at axial location 51 proximate to but short of the distal tip 50 and runs toward the annular groove 42. The double start thread 52 includes intertwined helical thread portions 54 and 56, each having a thread height that reduces when moving toward the axial start location 51. In addition, thread portion 54 extends from axial location 51 and all the way to the groove 42, while thread portion 56 extends from axial location 51 and stops short of the groove at axial location 58. As shown, diametrically opposed flats 60 run from location 51 toward the distal tip of the screw to aid in initial penetration.

FIGS. 10-14 depict an anchor install sequence. Per FIG. 10, the anchor 10 is initially placed with its distal tip against the wall 100 and an axial force 102 and rotation force 104 are applied (e.g., using a screwdriver or a power tool). These forces move the tip into the wall sufficiently to bring the double start thread 52 into contact with the wall to begin boring a hole in the wall material. The axial and rotational forces continue to be applied until the flange of the anchor seats flush against the wall surface per FIG. 11. In this position, the thread 22 engages with the wallboard material and provides relatively solid retention against axial pull-out.

Figure 12:
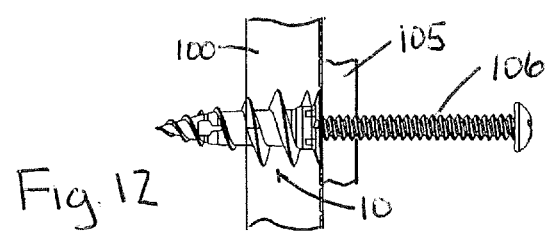
Figure 13:
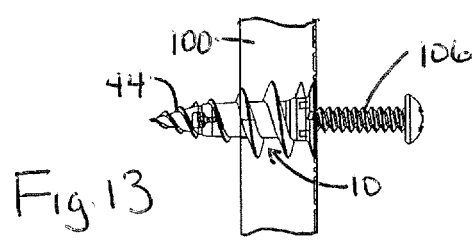
Figure 14:
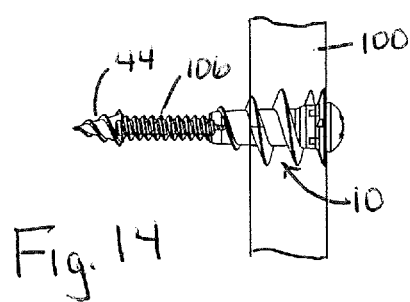
Figure 15:
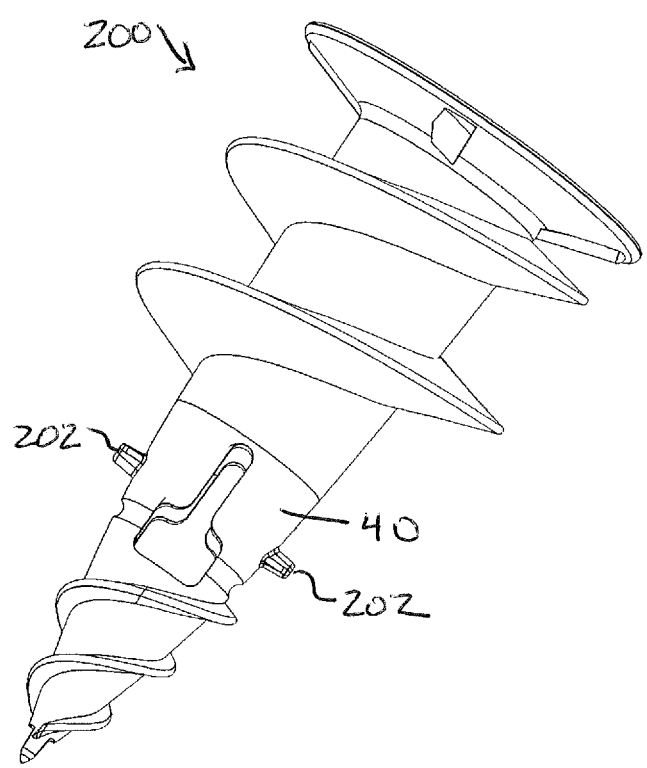
FIGS. 15-18 show another embodiment of an anchor.
Figure 16:
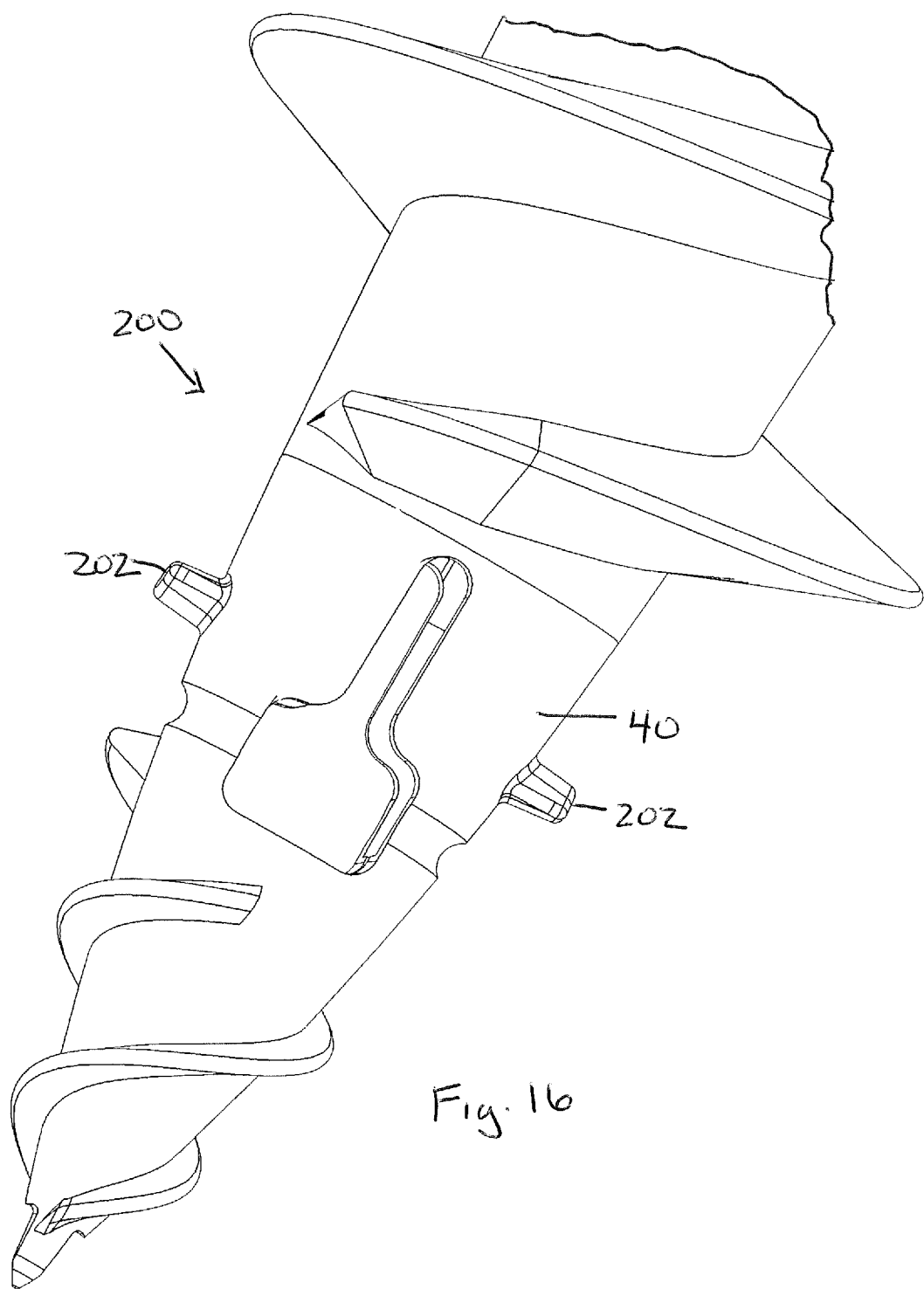
Figure 17:
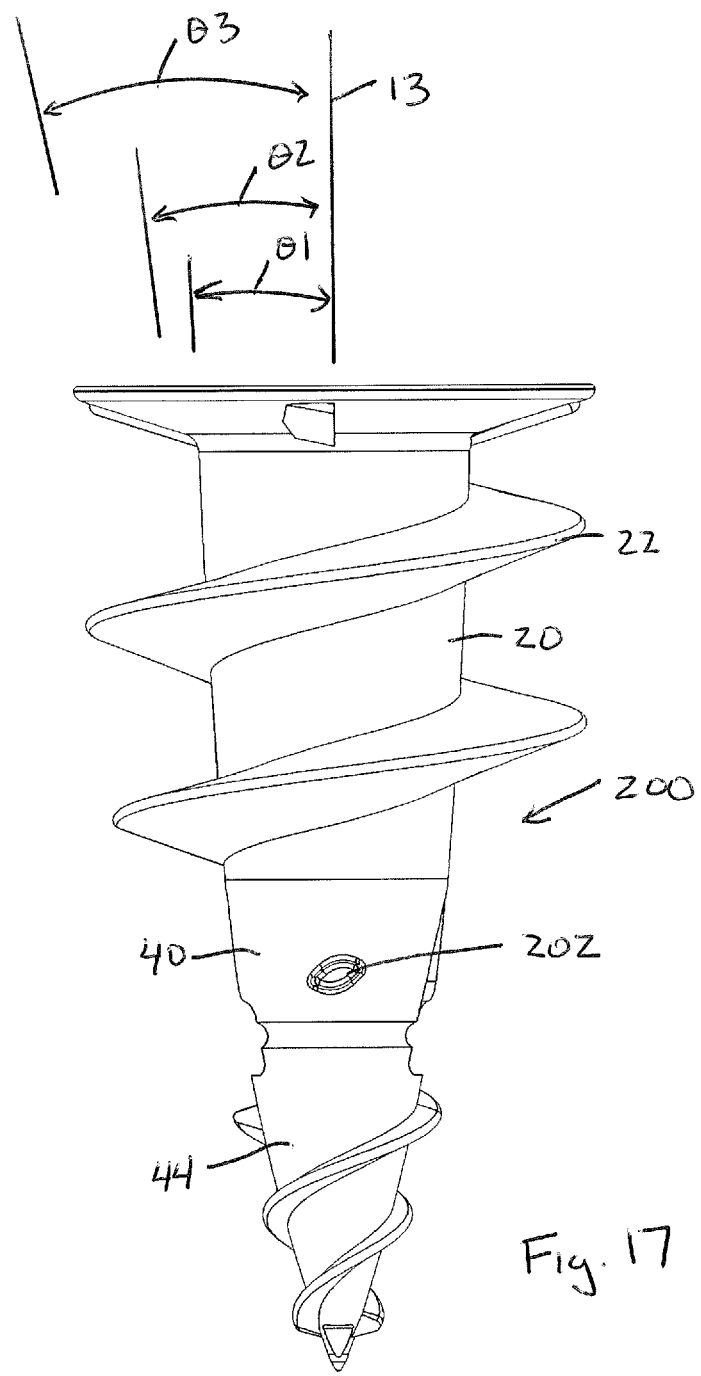
Figure 18:
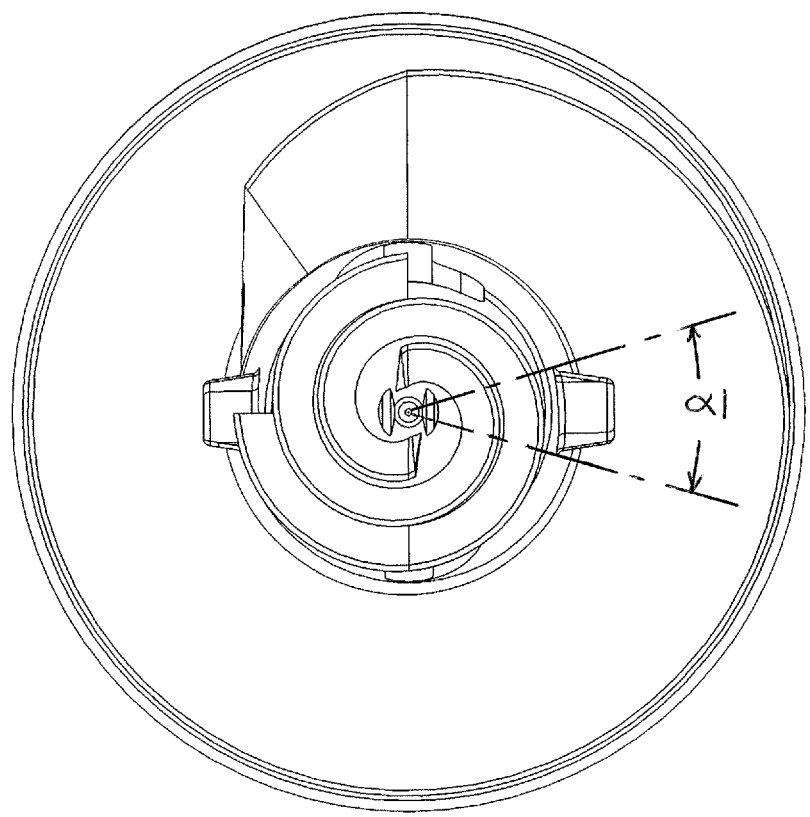

An object 105 can be mounted to the anchor and wall using a threaded fastener 106 per FIG. 12, where the fastener passes through a hole in the object and then into the internal bore of the anchor 10. The fastener threadedly engages with internal portions of the anchor bore. The fastener may be axially sized so that when the distal tip of the fastener reaches the internal end of the bore (FIG. 13 position), further rotation of the fastener causes the end body portion 44 of the anchor to break away per FIG. 14. Notably, in FIGS. 13 and 14 here, the object being hung is not shown. Typically, the fastener 102 will be long enough to cause the end body portion 44 to separate from the rest of the anchor before the fastener head tightly engages the object and presses the object against the wall.

FIGS. 15-18 show another embodiment of an anchor 200 that is the same as the anchor 10 described above, except for (i) the inclusion of a pair of diametrically opposed lugs or tabs 202 on the body portion 40 and (ii) the inclusion of slightly more aggressive taper angle θ3 on the end body portion 44 than the taper angle θ2 on the body portion 40. Here, the circumferential centers of the lugs 202 are offset from the circumferential centers of the key-shaped through openings 41 by ninety degrees. The lugs 202 are also located at common axial positions along the length of the anchor. The lugs may aid in removal of material during entry into a wall or if the anchor engages into a stud behind the wall. In one implementation, the lugs extend both axially and circumferentially, and each of the lugs 202 extends circumferentially through an angle α1 of no more than about fifty degrees in axial end view (e.g., such as no more than about forty degrees in axial end view).

Figure 19:
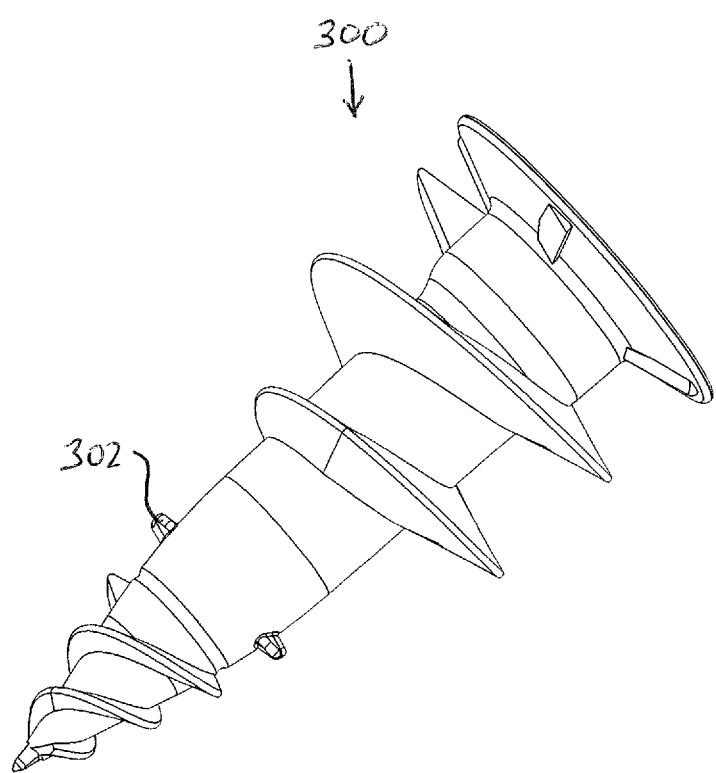
FIGS. 19 and 20 show another embodiment of an anchor.
Figure 20:
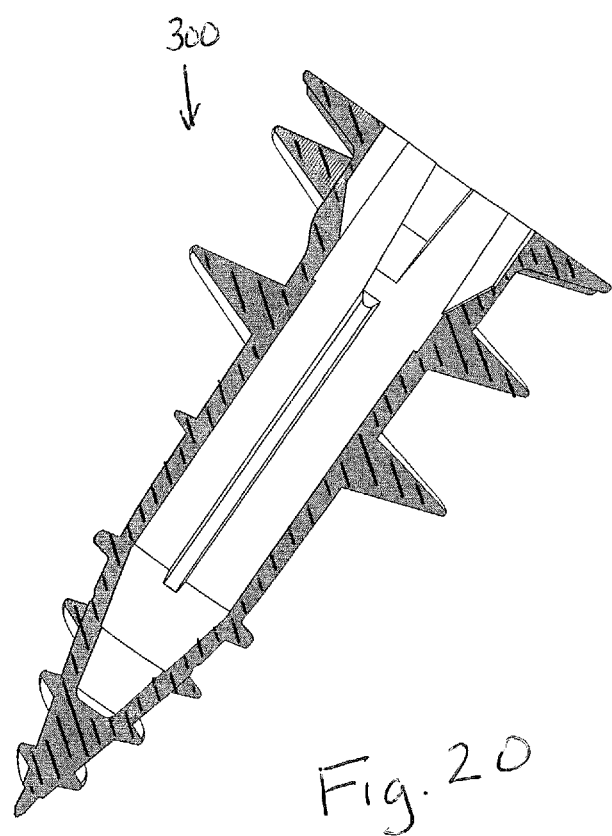

It is to be clearly understood that the above description is intended by way of illustration and example only, is not intended to be taken by way of limitation, and that other changes and modifications are possible. For example, embodiments in which the key-shaped through openings are not present are possible. FIGS. 19-20 depict an embodiment of such an anchor 300 with lugs or tabs 302, where FIG. 20 is a cross-section view. The anchor 300 is otherwise the same as anchor 200. An embodiment the same as anchor 10, but without the key-shaped openings, is also possible.

What is claimed is:

1. An anchor for wallboard installation, comprising:
    an anchor body elongated along an axis, the anchor body including a driving end, a wall boring end and an internal bore running from the driving end to an internal end short of a distal tip of the wall boring end;
    wherein the anchor body includes a first frusto-conical body portion, a second frusto-conical body portion and an end body portion, the second frusto-conical body portion running from the first frusto-conical body portion to the end body portion, the end body portion running toward the distal tip, wherein the anchor body further includes an annular groove located between the first frusto-conical body portion and the end body portion, wherein the first frusto-conical body portion includes a thread, the end body portion includes a double start thread, and the second frusto-conical body portion lacks any thread.

2. The anchor of claim 1, wherein a taper angle of the second frusto-conical body portion is greater than a taper angle of the first frusto-conical body portion, and wherein a taper angle of the end body portion is equal to or less than the taper angle of the second frusto-conical body portion.

3. The anchor of claim 1, wherein the first body portion includes a thread, the end body portion includes a thread, and the anchor body includes a pair of diametrically opposed key-shaped through openings to the internal bore.

4. The anchor of claim 3, wherein the key-shaped through openings intersect the annular groove.

5. The anchor of claim 4, wherein the key-shaped through openings include a blade section and a bow section, wherein the blade section is located entirely on the second body portion and the bow section begins on the second body portion and extends onto the end body portion.

6. The anchor of claim 1, wherein the anchor body includes a flange that extends outward from an end of the first body portion, wherein a wall facing side of the flange includes a taper.

7. The anchor of claim 6, wherein the wall facing side of the flange includes a plurality of wall engaging nibs.

8. The anchor of claim 7, wherein each nib includes a leading ramped face and a trailing stepped face.

9. An anchor for wallboard installation, comprising:
    an anchor body elongated along an axis, the anchor body including a driving end, a wall boring end and an internal bore running from the driving end to an internal end short of a distal tip of the wall boring end;
    wherein the anchor body includes a first body portion, a second body portion and an end body portion, the second body portion running from the first body portion to the end body portion, the end body portion running toward the distal tip;
    wherein the first body portion includes a thread, the end body portion includes a double start thread, and the second body portion lacks any thread;
    wherein the internal bore runs from the driving end and extends along both the first body portion and the second body portion.

10. The anchor of claim 9, wherein the second body portion includes a set of diametrically opposed lug projections that have a common axial location along a length of the anchor body.

11. An anchor for wallboard installation, comprising:
    an anchor body elongated along an axis, the anchor body including a driving end, a wall boring end and an internal bore running from the driving end to an internal end short of a distal tip of the wall boring end;
    wherein the anchor body includes a first body portion, a second body portion and an end body portion, the second body portion running from the first body portion to the end body portion, the end body portion running toward the distal tip;
    wherein the first body portion includes a thread, the end body portion includes a thread, and a set of diametrically opposed flats are formed on the end body portion and run from an axial location toward the distal tip.

12. An anchor for wallboard installation, comprising:
    an anchor body elongated along an axis, the anchor body including a driving end, a wall boring end and an internal bore running from the driving end to an internal end short of a distal tip of the wall boring end;
    wherein the anchor body includes a first body portion, a second body portion and an end body portion, the second body portion running from the first body portion to the end body portion, the end body portion running toward the distal tip;

wherein the end body portion includes a double start thread with a first helical thread portion offset from a second helical thread portion, wherein the first helical thread portion and the second helical thread portion begin at a first axial location along the anchor body, wherein the first helical thread portion runs to a second axial location along the anchor body, wherein the second helical thread portion runs to a third axial location along the anchor body, wherein the second axial location is between the first axial location and the third axial location, wherein the third axial location is axially spaced away from the first body portion such that the second helical thread portion terminates short of the first body portion, wherein the first body portion includes an external thread that is separate from the first helical thread portion and the second helical thread portion, wherein the external thread begins at a starting axial location, runs in a direction toward the distal tip and terminates at an ending axial location, wherein the ending axial location is between the third axial location and the driving end;

wherein the internal bore runs from the driving end and extends along both the first body portion and the second body portion.

13. An anchor for wallboard installation, comprising:
an anchor body elongated along an axis, the anchor body including a driving end, a wall boring end and an internal bore running from the driving end to an internal end short of a distal tip of the wall boring end;
wherein the anchor body includes a first frusto-conical body portion, a second frusto-conical body portion and an end body portion, wherein the second frusto-conical body portion is between the first frusto-conical body portion and the end body portion;
wherein a taper angle of the second frusto-conical body portion is greater than a taper angle of the first frusto-conical body portion;
wherein a taper angle of the end body portion is equal to or less than the taper angle of the second frusto-conical body portion;
wherein the first frusto-conical body portion includes a thread, the end body portion includes a double start thread, and the second frusto-conical body portion lacks any thread.

14. The anchor of claim 13, wherein the second frusto-conical body portion includes a set of diametrically opposed lug projections that have a common axial location along a length of the anchor body.

15. An anchor for wallboard installation, comprising:
an anchor body elongated along an axis, the anchor body including a driving end, a wall boring end and an internal bore running from the driving end to an internal end short of a distal tip of the wall boring end;
wherein the anchor body includes a first frusto-conical body portion, a second frusto-conical body portion and an end body portion, wherein the second frusto-conical body portion is between the first frusto-conical body portion and the end body portion;
wherein the first frusto-conical body portion includes a thread, the end body portion includes a thread, and the second frusto-conical portion lacks any thread;
wherein the second frusto-conical portion includes at least one lug projection.

16. The anchor of claim 15, wherein the second frusto-conical portion include a pair of diametrically opposed lug projections.

17. The anchor of claim 16, wherein each lug projection extends circumferentially through no more than about fifty degrees in axial end view.

* * * * *